Sept. 8, 1953 — I. STAGG — 2,651,335
LOG SAWMILL FOR SMALL DIMENSION TIMBER
Filed March 31, 1952 — 2 Sheets-Sheet 1
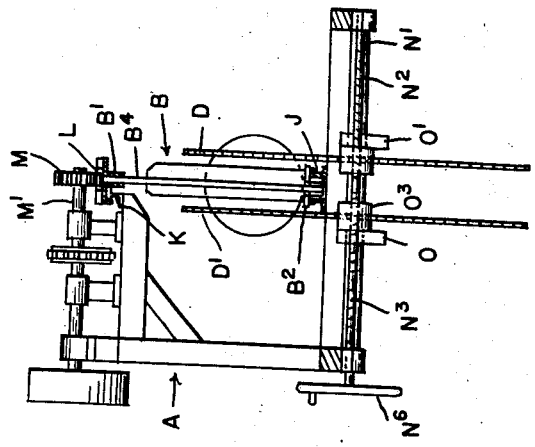
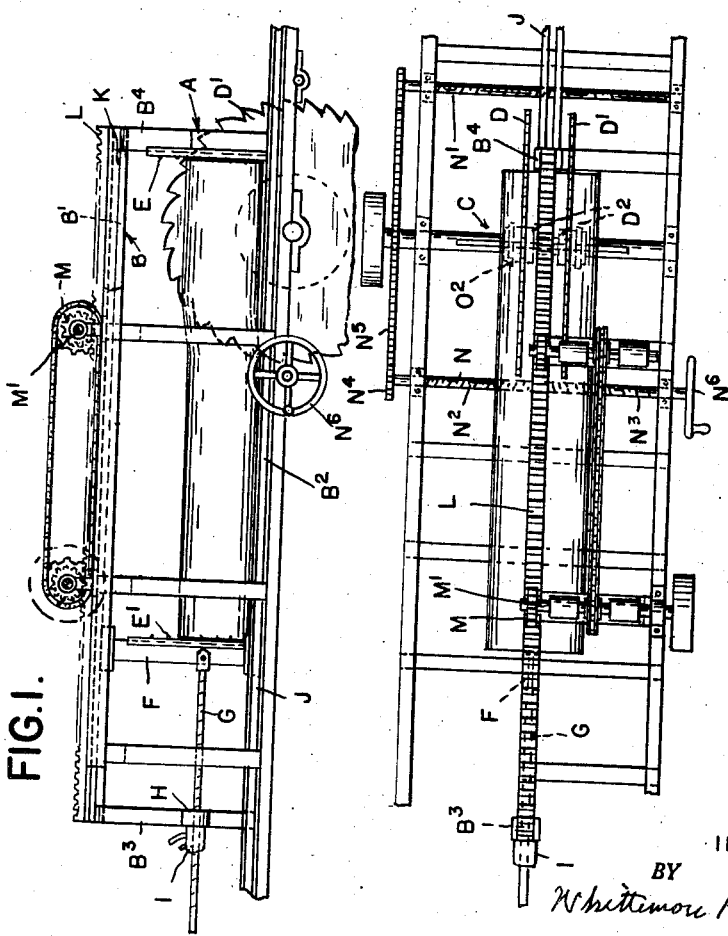
INVENTOR.
IRVING STAGG Sept. 8, 1953

I. STAGG 2,651,335

LOG SAWMILL FOR SMALL DIMENSION TIMBER

Filed March 31, 1952

INVENTOR.
IRVING STAGG
BY
*Whittemore Hulbert & Belknap*
ATTORNEYS

Patented Sept. 8, 1953

2,651,335

UNITED STATES PATENT OFFICE 2,651,335

LOG SAWMILL FOR SMALL DIMENSION TIMBER

Irving Stagg, Wayne, Mich.

Application March 31, 1952, Serial No. 279,562

2 Claims. (Cl. 143—105)

It is the primary object of the invention to obtain a construction of saw mill which can be economically used in the cutting of lumber from logs which are small in diameter and irregular in shape. A great deal of sound timber of this character is available but it does not pay to cut the same on a regular saw mill designed for logs of large dimensions.

I have therefore devised a construction in which the logs when once placed on the carriage are not shifted in position until all of the lumber is cut therefrom.

A further feature of the invention is that boards are simultaneously sawed from opposite sides of the center or heart of the timber and the part remaining after the final cuts is of a standard thickness such, for instance, as four inches.

Still another feature of the invention is the construction of the carriage and the means for mounting the logs thereon which expedites the performance of the work.

As illustrated in the drawings:

Figure 1 is a side elevation;

Figure 2 is a plan view;

Figure 3 is an end elevation;

Figure 4:
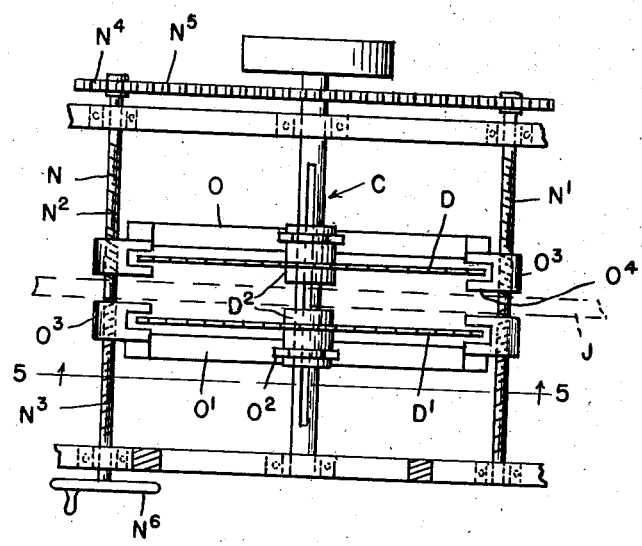
Fig. 4 is a plan view of the saw adjusting mechanism.
Figure 5:
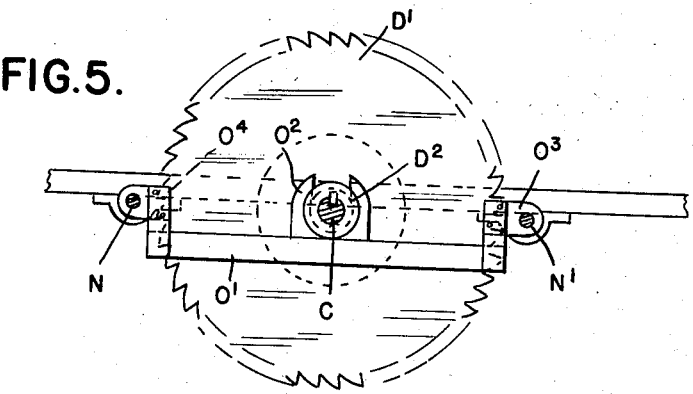
Fig. 5 is a section on line 5—5, Fig. 4.

In general construction the mill comprises a frame A on which is travelingly mounted a narrow carriage B, and an arbor C mounted on the frame beneath the carriage extending transversely thereof has a pair of circular saws D and D' adjustably mounted thereon on opposite sides of the carriage.

Carriage

The carriage B is preferably a rectangular frame including bottom and top rails B' B² and vertical end rails B³ and B⁴. These rails may be angle bars or any other suitable structural shape to impart the desired rigidity but are restricted in width so that all parts of the frame that pass between the saws are less than four inches in width. The end rail B⁴ is provided with a series of sharpened dogs or spikes E intended to bite into the end of the log placed on the carriage. The opposite end of the log is engaged by similar dogs E', which are mounted on a vertical cross member F slidably mounted on the bottom and top rails B' and B². A rod G attached to the cross member F extends through a bearing H on the end rail B³ and a jack I of any suitable construction is also mounted on this rail to advance the rod G and to press the dogs into the ends of the log. The carriage engages a bottom track J and a top track K, both mounted on the frame and together holding the carriage in a fixed plane with reference thereto. The carriage may be reciprocated on the frame by any suitable mechanism but, as illustrated, the top rail B' has a rack member L secured thereto and a gear M on a shaft M' driven by any suitable mechanism (not shown) engages this rack to reciprocate the carriage.

Saw adjusting mechanism

The saws D and D' have hubs D² which have a splined engagement with the arbor C so as to be adjustable to different positions thereon. On opposite sides of the arbor parallel thereto and positioned to clear the saws are rotary shafts N and N' journaled in bearings on the frame and each having right-hand and left-hand screw threaded portions N² and N³ extending on opposite sides of the longitudinal center. Bars O and O' extend across between the shafts adjacent respectively to the saws D and D' and each has a fork O² engaging a groove in the hub of the saw. The opposite ends of the bars O and O' have nut portions O³ engaging the threads of the shafts, and there are also guides O⁴ for the saws engaging the same near the periphery which are connected to said bars or nuts to move therewith. Sprockets N⁴ and a chain N⁵ connect the shafts with each other, and an operating handle N⁶ attached to one of the shafts may be used for rotatively adjusting the same to simultaneously adjust the positions of both saws.

With the construction as described the logs may be easily engaged with the carriage from one side thereof and clamped between the uprights B⁴ and F by operation of the jack I which adjusts the rod G. The dogs E and E', which engage the opposite ends of the log in a central plane thereof, will rigidly secure it to the carriage. The saws are then adjusted for cutting the first boards or slabs off from the opposite sides of the log while the carriage is reciprocated and successive adjustments of the saws are made for severing other boards until the innermost position of adjustment is attained. This will still leave a center portion formed by the heart of the log which is four inches in thickness and may be re-cut to two by fours, four by fours, or any other size desired.

The logs which may be economically cut with this machine vary in diameter from six to twelve or fourteen inches and are of varying lengths, these dimensions being too small for economic cutting with a full sized saw mill.

What I claim as my invention is:

1. A log saw mill for cutting small dimension timber comprising a rigid frame having spaced top and bottom horizontal rails mounted thereon to extend parallel to each other in a vertical plane, a carriage formed by a rectangular open frame having top and bottom rails travelingly engaging the corresponding rails of said rigid frame, vertical end rails and an intermediate vertical rail adjustably engaging said top and bottom carriage rails, said intermediate rail and one of said end rails having sharp dogs thereon for centrally engaging opposite ends of a log, the transverse dimension of all parts of said carriage within the vertical limit of the opening in its frame being less than four inches and being held by said rigid frame in a fixed plane, an arbor extending transversely beneath said carriage mounted on said rigid frame, a pair of circular saws mounted on said arbor on opposite sides of said carriage, means for reciprocating said carriage to carry the log past said saws, and means for adjusting said saws on said arbor to positions equally spaced on opposite sides of the central plane of said carriage for simultaneous cuts with an inner limit of adjustment just clearing the carriage.

2. The construction as in claim 1 in which the adjustment means for the carriage includes a rod connected to said intermediate rail and extending through a bearing on one of the end rails, and a jack on the latter rail for actuating said rod to clamp the log and to lock it in clamped position.

IRVING STAGG.

References Cited in the file of this patent

UNITED STATES PATENTS

| Number | Name | Date |
|---|---|---|
| 51,282 | Ames | Dec. 5, 1865 |
| 202,073 | Thompson | Apr. 2, 1878 |
| 243,745 | Wilson | July 5, 1881 |
| 436,420 | Hodgson | Sept. 16, 1890 |
| 707,184 | Thomas | Aug. 19, 1902 |
| 1,180,842 | Goetz | Apr. 25, 1916 |
| 1,229,760 | Krohn et al. | June 12, 1917 |
| 1,506,529 | Jarosz | Aug. 26, 1924 |
| 2,254,293 | Kaehlert | Sept. 2, 1941 |
| 2,501,299 | Anderson | Mar. 21, 1950 |
| 2,595,879 | Pasquier | May 6, 1952 |

FOREIGN PATENTS

| Number | Country | Date |
|---|---|---|
| 52,385 | Germany | June 7, 1890 |